United States Patent [19]

Frerot et al.

[11] Patent Number: 5,780,090

[45] Date of Patent: Jul. 14, 1998

[54] FLAVORED PRODUCTS AND A PROCESS FOR THEIR PREPARATION

[75] Inventors: Eric Frerot, Ville le Grand; Sina Dorothea Escher, Confignon, both of France

[73] Assignee: Firmenich SA, Geneva, Switzerland

[21] Appl. No.: 793,890

[22] PCT Filed: Jul. 18, 1996

[86] PCT No.: PCT/IB96/00723

§ 371 Date: Mar. 12, 1997

§ 102(e) Date: Mar. 12, 1997

[87] PCT Pub. No.: WO97/04667

PCT Pub. Date: Feb. 13, 1997

[30] Foreign Application Priority Data

Jul. 26, 1995 [CH] Switzerland ............................ 2189/95

[51] Int. Cl.$^6$ ..................... A23L 1/22; A23L 2/56; A23J 1/00

[52] U.S. Cl. ..................... 426/534; 426/535; 426/536; 426/537; 426/538; 426/544; 426/545; 426/656; 426/657; 530/331; 562/433

[58] Field of Search .................. 426/534, 535, 426/536, 537, 538, 544, 545, 656, 657, 433; 530/331

[56] References Cited

U.S. PATENT DOCUMENTS 4,130,555  12/1978  Ohtsuka et al. ......................... 530/354

FOREIGN PATENT DOCUMENTS 605797   1/1991   Australia .
2 245 298  4/1975  France .
51-073113  6/1976  Japan .
54-17014   6/1979  Japan .
1083058    6/1989  Japan .
WO 95/34222  12/1995  WIPO .
WO 96/10927  4/1996  WIPO .

OTHER PUBLICATIONS

M. Noguchi et al., "Isolation and Identification of Acidic Oligopeptides Occuring in a Flavor Potentiating Fraction from a Fish Protein Hydrolysate", *J .Agr. Food Chem.*, vol. 23, No. 1 (1975) pp. 49–53.

Y. Yamasaki et al., "Synthesis of a Peptide with Delicious Taste", *Agric. Biol. Chem.*, vol. 44, No. 1 (1980), pp. 93–97.

J. Coste et al., "PyBOP®: A New Peptide Coupling Reagent Devoid of Toxic By-Product", *Tetrahedron Letters*, vol. 31, No. 2 (1990), pp. 205–208.

E. Frérot et al., "PyBop® and PyBroP: Two Reagents for the Difficult Coupling of the α,α-Dialkyl Amino Acid, Aib", *Tetrahedron*, vol. 47, No. 2 (1991), pp. 259–270.

Nomenclature and Symbolism for Amino Acids and Peptides, *Eur. J. Biochem.*, 138 (1984), pp. 9–37.

Sigma Catalogs, 1990, pp. 70–74.

*Primary Examiner*—Mary E. Mosher
*Assistant Examiner*—Ali R. Salimi
*Attorney, Agent, or Firm*—Pennie & Edmonds LLP

[57] ABSTRACT

Tripeptides containing a hydrophobic amino acid residue and at least one acidic amino acid residue, together with amino acid derivatives having a structure of the N-lactoyl-X type, where X represents an amino acid residue, are very useful flavoring ingredients for the preparation of flavoring compositions and flavored food products upon which they confer a remarkable fullness and mouthfeel.

16 Claims, No Drawings

FLAVORED PRODUCTS AND A PROCESS FOR THEIR PREPARATION

FIELD OF TECHNOLOGY AND PRIOR ART

This invention relates to the subject of flavours and more particularly to that of the flavouring of products upon which it is desired to confer a fuller and richer texture, i.e. organoleptic characteristics of the type generally associated with products containing fats, particularly butter and cheese, and an organoleptic character of the spicy salty ("savoury") type.

With this object the invention relates to the use as a flavouring ingredient of:

a) one or more tripeptides containing a hydrophobic amino acid residue and at least one acid amino acid residue, and/or b) one or more amino acid derivatives having a structure of the N-lactoyl-X type, where X represents an amino acid residue.

By a "hydrophobic amino acid residue" is meant here a residue of one of the common amino acids which are generally recognised as being hydrophobic, namely alanine (Ala), methionine (Met), valine (Val), leucine (Leu), proline (Pro), phenylalanine (Phe), tyrosine (Tyr), isoleucine (Ile) and tryptophan (Trp).

Likewise, by "acidic amino acid residue" is here meant the residue from glutamic acid (Glu) or the residue from aspartic acid (Asp).

The tripeptide used according to the invention is thus formed from one of the abovementioned hydrophobic residues and at least one acidic residue from Glu and Asp. The third amino acid residue may again be an acidic residue, or it may be selected from the residues of one of the hydrophilic amino acids, namely cysteine (Cys), glycine (Gly), glutamine (Glu), serine (Ser), threonine (Thr) and asparagine (Asn), or one of the basic amino acids, namely lysine (Lys), arginine (Arg), ornithine (Orn) and histidine (His).

The term "amino acid residue" above has the meaning common in the art, that is that it refers to the set of atoms provided by the amino acid corresponding to the tripeptide chain. These residues will henceforth be represented by the three letter abbreviations shown in brackets above, which are in current use for defining the structure of polypeptide chains (see, e.g., Eur. J. Bioch. 1984, 138, 9–37).

In accordance with the invention, an amino acid derivative having a structure of the N-lactoyl-X type, where X represents an amino acid residue, can be used as a flavouring ingredient instead of the tripeptide, or in addition to it. This invention is therefore concerned with compounds which include an N-lactoyl or 2-hydroxypropanoyl radical, which will henceforth be indicated by the abbreviation "Lac", and a residue of one of the common amino acids mentioned above. Thus, and to provide a specific example, one of these derivatives according to the invention is the derivative (S)-Lac-Met, whose structure is as follows:

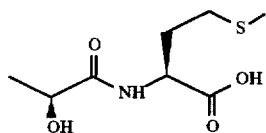

As will be clear from the above, because asymmetric carbon atoms are present in the structure of the compounds according to the invention, they can occur in the form of several configurational isomers which can all be used satisfactorily for the purposes of the invention, either individually, or as mixtures of isomers. Their configuration will also typically be governed by that of the starting amino acids used to prepare the tripeptides and lactoyl derivatives according to the invention.

We have in fact discovered that the abovementioned tripeptides and amino acid derivatives are very useful flavouring ingredients, which, despite the fact that they are virtually devoid of any taste of their own, are nevertheless capable of imparting very much appreciated organoleptic characteristics to the products to which they are added, specifically a quite remarkable roundness, creaminess and substance. Because of this, they can improve the oral perception or "mouthfeel" of products to which they are added, a result which is particularly useful when these tripeptides and amino acid derivatives are used for the preparation of flavouring compositions intended for flavouring "low-fat" or "low-calorie" consumer products, that is products which are low in fats, or when they are added directly to these products. In particular it has been found that when combined with other commonly used flavouring materials essentially comprising compositions based on volatile substances which are capable of conferring a special taste upon the products with which they are incorporated, they can not only increase the organoleptic effect of these volatiles, but they can also provide a fullness of the type of that conferred by the presence of fats in foodstuffs and in flavouring compositions of the conventional butter or cheese type, frequently prepared using natural concentrates derived from milk and similar products.

It has also been observed that the tripeptides and amino acid derivatives according to the invention are also capable of producing organoleptic effects of the type of that which can be obtained using monosodium glutamate (MSG), a flavouring ingredient well known for its effect of the "umami" type and widely used in, e.g., cooking of the oriental type. They can in fact contribute to providing or strengthening the umami characteristic in products to which they are added, and at least partly replace MSG, their effect being less stock-like and less salty than the latter, and therefore more useful for some types of applications.

Now this result is wholly unexpected in the light of the prior art. In fact, despite the fact that some tripeptides are known to be natural components of e.g. cheese, soy sauce or again fish hydrolysate, these are for the most part tripeptides which either do not contain hydrophobic residues, or contain two or three, their taste being then too bitter to find useful employment. Furthermore, the organoleptic effect of the tripeptides currently identified in these natural products has often been felt to be much less than that of MSG, even in those cases where these tripeptides have proved to be of organoleptic interest.

Thus, as far as we are aware, only M. Nogushi et al., J. Agr. Food Chem., 1975, 23, 49, have identified tripeptides containing a single hydrophobic residue, namely Glu-Asp-Val, (Glu.Ile)-Asp, Glu-Gly-Ala and Ile-Glu-Glu, in fish hydrolysate. However, while the other tripeptides mentioned by these authors, which are of an essentially acidic nature, are described as having a taste resembling that of MSG, but less strong, the tripeptides mentioned which contain a hydrophobic residue were felt to be of no interest and were described as having a bitter or flat taste. Furthermore no suggestion was made concerning the potential interest of the latter for use for flavouring purposes, unlike the situation with acid tripeptides.

Furthermore, although several tripeptides containing a hydrophobic residue and at least one acidic residue have been quoted previously in the case of investigations into protein synthesis, to our knowledge it has never been suggested that such tripeptides should be added to products for consumption, or again to flavouring compositions containing other commonly used flavouring ingredients in order to improve their mouthfeel, or to alter their organoleptic profile.

As far as amino acid derivatives of the Lac-X type are concerned, to our knowledge only Lac-Phe, Lac-Ile, Lac-Ala, Lac-Val and Lac-Gly have been cited in the literature, and this in the context of investigations which are wholly outside the field of flavours. There is therefore no description of the organoleptic properties of these previously cited compounds.

DESCRIPTION OF THE INVENTION

The object of the invention is therefore a process for the flavouring of foodstuffs and other edible products in which a tripeptide and/or an amino acid derivative as mentioned above is used as a flavouring ingredient.

Thus, in accordance with a preferred embodiment according to the invention, one or more tripeptides and/or one or more amino acid derivatives as defined above are added to a product which can be eaten by man or animals or to a pharmaceutical product, in a sufficient quantity to impart, improve or increase the mouthfeel of the said product.

In accordance with another preferred embodiment of the invention, the tripeptide used as a flavouring agent contains two acidic residues. As will be seen from the examples provided below, these tripeptides containing one hydrophobic residue and two acidic residues, and more particularly those in which the acidic residues are glutamyl residues, provide flavouring compositions and flavoured products with quite remarkable organoleptic characteristics and increase their roundness, creaminess and in general the sensation which they cause in the mouth when they are consumed.

Furthermore, it has also been observed that particularly useful results from the organoleptic point of view have been obtained when the tripeptide used is selected from Glu-Glu-Leu, γGlu-Glu-Leu or Glu(Glu-Leu), Leu-Glu-Glu, Glu-Asp-Phe, Glu-Glu-Ile, Asp-Glu-Leu and Glu-Leu-Glu. Glu-Glu-Leu in particular has proved to be very effective in conferring flavour characteristics of the type of those which are characteristic of MSG, particularly when this peptide is used in molar quantities comparable to those in which MSG is typically used.

In general it has been found that the tripeptide according to the invention has an impact comparable in strength to that of MSG, while imparting a less pronounced salty stock flavour.

Of the amino acid derivatives which can be used according to the invention it has been found that the best results are obtained with Lac-Glu, Lac-Ala and Lac-Met, and in particular with the latter.

Flavoured products resulting from use according to the invention containing the abovementioned tripeptides and/or amino acid derivatives are also an object of the invention. They may take the form of finished products such as food and drinks to which the abovementioned tripeptides and/or derivatives of the Lac-X type have been added directly. Alternatively, the compounds according to the invention may be used for the preparation of flavouring compositions which are themselves intended to be incorporated into the aforesaid finished products. These flavouring compositions will typically contain other flavouring ingredients whose effect might influence the taste of the foodstuff rather than its consistency or mouthfeel, as well as currently used solvents or additives, in particular the microencapsulation media in common use. Flavouring compounds according to the invention may also be used in combination with flavouring compositions of the type of those described in patent applications WO 95/34222 and WO 96/10927, the contents of which are hereby included by reference.

The flavouring compositions so obtained may be used to improve or increase the mouthfeel of a great variety of products which can be eaten by man and animals. Reference may be made by way of example to low fat margarines and butters, as well as yoghurts, ice creams, cheeses, milk and milk-based products or milk derivatives, including drinks, but also food products such as ready-to-eat cooked dishes, mayonnaises, soups, sauces, sweet or savoury biscuits, chocolates, sweets and caramels, snacks, in particular crisps, desserts and drinks, in particular of the tropical fruits type, or again animal feedstuffs.

Of course, and as mentioned earlier, such flavoured products may also be obtained by adding the tripeptide and/or amino acid derivatives according to the invention directly to these products.

In general, all low fat food products can be improved from the point of view of consistency and mouthfeel using these tripeptide or amino acid derivatives, or flavouring compositions containing them. Furthermore, as shown by the examples provided below, the peptides and amino acid derivatives according to the invention can also alter the flavour notes of the composition or foodstuff with which they are incorporated, in parallel with or independently of the creamy type effect and mouthfeel already mentioned above. Thus these compounds according to the invention have proved to be useful for all applications of the savoury type, i.e. spiced, salty and sharp-tasting foods. They are therefore particularly suitable for flavouring cooked dishes or snacks and other salted foods, and for the preparation of flavours and flavouring compositions intended for this type of foodstuff.

It goes without saying that, despite the fact that the flavouring ingredients according to the invention are particularly useful for the flavouring of low fat products, they can also be used to flavour ordinary non-fat-reduced foodstuffs to which they will give a fuller and more creamy consistency, or accentuate organoleptic characteristics associated with the presence of fats and/or MSG. This applies particularly in the case of preparations of the meat type, cheeses, or butters and margarines, products in which the abovementioned tripeptides and derivatives of the Lac-X type have proved particularly useful and effective for the intended purpose.

The concentrations in which the tripeptide and amino acid derivatives according to the invention can be added to the various products mentioned above depend on the nature of these products and the flavouring effect which it is desired to obtain. They can therefore vary within a very wide range. For example, when these compounds are used for the preparation of flavouring compositions which are themselves intended to be incorporated in foodstuffs and drinks, they will typically be added to these compositions in proportions of the order of 0.01 to 1%, or even up to 10% by weight with respect to the weight of the composition. When the compounds according to the invention are added directly to foodstuffs and drinks which are to be flavoured they may be used in proportions of the order of 0.001 to 0.5%, or even 1% by weight with respect to the weight of the foodstuff or drink. Of course these values can only be given by way of example, as concentrations below or above the limits stated above may prove appropriate in certain applications through practical experience. Those skilled in the art will also be in a position to choose them in relation to their nature.

It should be noted that the flavouring compositions according to the invention include in particular mixtures of two or more tripeptides as described above, mixtures of two or more derivatives of the Lac-X type as described above, or again mixtures of one or more of these tripeptides with one or more of these derivatives. It has in fact been found that these mixtures make it possible to obtain particularly rich and balanced organoleptic effects. Furthermore, it has also been found that these compounds combine particularly well with amino acids, reinforcing the organoleptic effect of the latter, which confer a fullness on flavouring compositions, the tripeptides and compounds of structure Lac-X according to the invention providing additional fullness and volume.

The invention thus provides flavouring processes and more particularly flavouring compositions capable of improving or conferring organoleptic characteristics which are typical of the presence of fats or ingredients such as MSG upon foodstuffs. In particular an improvement in the creamy consistency and fuller mouthfeel of these foods and drinks obtained according to the invention will be noted. They have more impact and a more lasting taste in the mouth, together with increased mouthfeel, than corresponding foodstuffs which have not been flavoured according to the invention.

Means of implementing the invention

The tripeptides and amino acid derivatives described above can be prepared from commercially available products using processes which make use of conventional reactions. These reactions may be of an essentially chemical type, as illustrated below, or of the enzymatic type, starting from appropriate substrates.

Of the processes of the chemical type, use has been made for example of conventional methods for synthesising peptides in solution using ordinary peptide coupling reagents such as PyBOP® (benzotriazolyloxy-tris[pyrrolidino]-phosphonium hexafluorophosphate; see J. Coste et al., Tetrahedron Lett. 1990, 31, 205 and 1991, 47, 259). The diagram below illustrates the strategy for a synthesis used to prepare the tripeptides according to the invention applied to the particular case of the tripeptide Leu-Glu-Glu:

intended it is necessary to obtain them in a pure state, completely free of any organic by-product, together with any salts, as the latter can alter the taste of the peptide and its organoleptic effect. This requirement has dictated the choice of hydrogenolysis as the final deprotection reaction.

As illustrated in Diagram I, two appropriate amino acids of L configuration are coupled together in the presence of PyBOP® in an appropriate solvent. The protected dipeptide so obtained is deprotected by acidolysis using trifluoroacetic acid (TFA) and then coupled with the third N-protected amino acid to form a protected tripeptide. Deprotection of the latter by hydrogenolysis in a solvent consisting of a mixture of dichloromethane, ethanol and water yields the desired tripeptide in the pure state.

General methods

A. Coupling reactions

A solution or suspension of the N-protected amino acid (1 equivalent), amino ester or peptide ester salt (1 equivalent) and PyBOP® (1 equivalent) in dichloromethane (2 ml/mmol) was treated for 1–2 hours with diisopropyl ethylamine (DIEA) at ambient temperature, with stirring. The reaction was followed by thin layer chromatography (TLC). The mixture was poured into ethyl acetate (50 times the volume of dichloromethane) and the resulting solution was treated as follows: the organic phase was washed with aqueous solutions of 5% $KHSO_4$, 5% $NaHCO_3$ and brine, dried over $Na_2SO_4$, filtered and the solvent was evaporated under vacuum. The product so obtained is purified by "flash" chromatography on silica gel using an appropriate eluent.

The starting protected amino acids were purchased from Novabiochem, Bachem or Propeptide and used as such. PyBOP® (origin: Nova) was dissolved in dichloromethane, washed with millipore water, dried over $Na_2SO_4$ and recovered by concentration under vacuum before being used.

B. Intermediate deprotections

A solution of N-t-butyloxycarbonyl-peptidyl ester in a 1:1 mixture of trifluoroacetic acid (TFA) and dichloromethane (5 ml/mmole) was stirred for 20 minutes at ambient temperature. Its solvents were evaporated under vacuum and the traces of remaining trifluoroacetic acid were evaporated by co-evaporation in diethyl ether under high vacuum. The peptide ester salts obtained in this way were used as such in the second coupling reaction in the method described under A.

DIAGRAM I

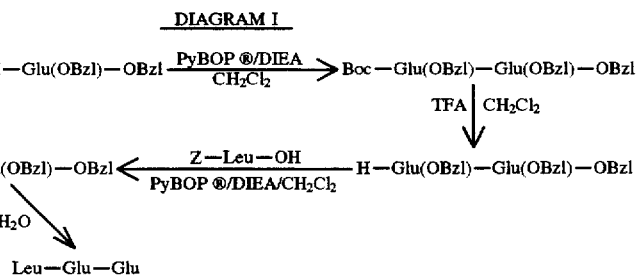

Boc = t-butyloxycarbonyl residue
Bzl = benzyl group
DIEA = diisopropyl-ethylamine
TFA = trifluoroacetic acid
Z = benzyloxycarbonyl residue In this system preparation of the tripeptides thus involves four stages, two coupling stages and two deprotection stages. Given the food use for which these products are C. Final deprotections A suspension of N-benzyloxycarbonyl-protected peptide and 10% Pd on activated carbon (10% by weight of the protecting group) in a 10:12:4 dichloromethane/ethanol/water mixture (26 ml/mmole) was stirred at ambient temperature for 4 days under hydrogen atmospheric pressure. After filtering off the palladium on Celite®, the organic solvents were concentrated under vacuum, and gas-free spring water (50 mm/mmole) was added. The aqueous solution was washed twice with ethyl acetate and twice with ether. The organic solvents were evaporated off under vacuum and the aqueous solution was freeze dried.

The methods described above made it possible to obtain the desired tripeptides with overall yields generally in excess of 60%.

All the peptides were analysed by proton and $^{13}C$ NMR (nuclear magnetic resonance) using correlations of the COSY and HMQC type. They were also analysed by MS (mass spectrometry), using chemical ionisation techniques (DCI-MS, $NH_3$) or electrospray techniques (ESI-MS/MS) and by HPLC (high performance liquid chromatography).

Conditions for spectral analysis

HPLC

Chromatograms were obtained in a Spectra Physics or Beckman apparatus at 30° C. using a 214 nm UV detector, a Nucleosil® RP-18, 5 µm, 100 Å, 25×cm×0.40 cm column; solvent A: 0.1% TFA in water; solvent B: 0.1% TFA in a 3:7 water/acetonitrile mixture; gradient for B: 0% (0–5 min), linear increase to 64% (5–40 min); flow 1 ml/min.

NMR

Spectra obtained using a Bruker AMX-360 and ARX-400.

DCI-MS

Spectra obtained using a Finnigan MAT-4500 apparatus, using ammonia as the ionising gas and a 70 eV filament.

ESI-MS/MS

A spectrometer of the VG biotech BIO-Q or Finnigan TSQ 700 type, using myoglobin for calibration in the m/z range 550–1650; 10 µl aliquots were injected directly into the source and elution was performed using equivalent volumes of acetonitrile, 0.1% aqueous TFA, methoxyethanol and isopropanol with a flow of 7 µl (VG Biotech) or with a 3:1 water/methanol mixture containing 0.1% acetic acid at 10 µl/min (Finnigan).

The following tripeptides were prepared in this way:
1. Glu-Asp-Ile
   Yield : 88% ; purity: 92.6%
   NMR ($^1H$, 360 MHz, $D_2O$): 4.83 (m/HDO, 1H, Hα Asp); 4.27 (d, J=5.6 Hz, 1H, Hα Ile); 4.11 (~t, J=6.7 Hz, 1H, Hα Glu); 2.94 (dd, $J_1$=16.4 Hz, $J_2$=5.6 Hz, 1H, Hβ Asp); 2.81 (dd, $J_1$=16.4 Hz, $J_2$=7.6 Hz, 1H, Hβ Asp); 2.54 (~t, J=7.1 Hz, 2H, Hγ Glu); 2.18 (~dd, $J_1$=7.1 Hz, $J_2$=6.7 Hz, 2I, Hβ Glu); 1.98–1.87 (m, 1H, Hβ Ile); 1.50–1.40 (m, 1H, Hγ Ile); 1.27–1.15 (m, 1H, Hγ' Ile); 0.93 (d, J=6.7 Hz, 3H, $CH_3$γ Ile), 0.87 (~t, J=7.1 Hz, 3H, $CH_3$δ Ile) δ ppm
   NMR ($^{13}C$): 179.3 (s); 178.6 (s); 177.2 (s); 172.0 (s); 61.1 (d); 55.2 (d); 53.3 (d); 39.4 (d); 38.7 (t); 32.2 (t); 29.0 (t), 27.6 (t); 18.0 (q); 13.6 (q) δ ppm
   ESI-MS/MS: 376.3 ($Y_3$'); 358.4 ($B_3$); 340.4, 312.4; 294; 247.4 ($Y_2$"); 245.4 ($B_2$); 227.3; 181.1; 132.1 ($Y_1$"); 102.0 (A1); 86.1 (($Y_1'A_3$)$_1$)

2. Glu-Asp-Phe
   Yield 100% ; purity: 80.8%
   NMR ($^1H$, 360 MHz, $D_2O$): 7.35 (m, 2H, Ph); 7.28 (m, 3H, Ph); 4.76 (~dd/HDO, $J_1$~8 Hz, $J_2$~5 Hz, 1H, Hα Asp); 4.62 (dd, $J_1$=8.8 Hz, $J_2$=5.0 Hz, 1H, Hα Phe); 4.02 (~t, J=6.4 Hz, 1H, Hα Glu); 3.22 (dd, $J_1$=14.0 Hz, $J_2$=5.0 Hz, 1H, Hβ Phe); 3.01 (dd, $J_1$=14.0 Hz, $J_2$=8.8 Hz, 1H, Hβ' Phe); 2.86 (dd, $J_1$=16.8 Hz, $J_2$=5.2 Hz, 1H, Hβ Asp), 2.73 (dd, $J_1$=16.8 Hz, $J_2$=8.4 Hz, 1H, Hβ' Asp); 2.38 (~dd, $J_1$=14.0 Hz, $J_2$=7.6 Hz, 2H, Hγ Glu); 2.12–1.96 (m, 2H, Hβ Glu) δ ppm
   NMR($^{13}C$): 179.2 (s); 178.1 (s); 177.0 (s); 174.1 (s); 171.8 (s); 139.6 (s, Ph); 132.2; 131.6; 130.0 (3d, Ph); 57.6 (d, Cα Phe); 55.1 (d, Cα Glu); 53.1 (d, Cα Asp); 39.7 (t, Cβ Phe); 38.7 (t, Cβ Asp); 32.2 (t, Cγ Glu); 28.9 (t, Cβ Glu) δ ppm
   ESI-MS/MS: 410.3 ($Y_3$"); 392.3 ($B_3$); 328.4; 218.2 ($Y_2$"); 245.3 ($B_2$); 227.1, 199.0; 166.1 ($Y_1$"); 120.0 (($Y_1'A3$)$_1$); 102.3 ($A_1$)

3. Leu-Glu-Glu
   Yield : 87% ; purity: 86.5%
   NMR ($^1H$, 360 MHz, $D_2O$): 4.47 (~t, J=7.2 Hz, 1H, Hα Glu); 4.36 (bs, 1H, Hα Glu); 4.05 (~t, J=6.8 Hz, 1H, Hα Leu); 2.51–2.42 (m, 4H, Hγ Glu); 2.06–1.92 (m, 2H, Hβ Glu); 1.80–1.49 (2m, 3H, Hβ Leu, Hγ Leu); 0.95 (~t, J=5.6 Hz, 3H, $CH_3$ Leu) δ ppm
   NMR ($^{13}C$) : 180.3 (s), 175.5 (s); 175.2 (s); 173.2 (s); 56.0 (d); 54.7 (d); 42.8 (t); 33.1 (t); 29.1 (t); 26.8 (d); 24.6 (q); 24.1 (q) δ ppm
   ESI-MS/MS - 390.5 ($Y_3$"), 372.5 ($B_3$): 344.3 ($A_3$); 277.1 ($Y_2$"); 259.1; 243.3 ($B_2$); 215.3 ($A_2$); 197.0; 180.2; 148.2 ($Y_1$"); 102.0 ($Y_1'A_3$); 86.3 (($Y_2'A_1$)$_1$)

4. Glu-Glu-Leu
   Yield: 100% ; Purity: 79.7%
   NMR ($^1H$, 360 MHz, $D_2O$): 4.47 (~t, J=6.8 Hz, 1H, Hα Glu ) 4.38 (bs, 1H, Hα Glu), 4.13 (~t, J=6.4 Hz, 1H, Hα Leu); 2.52 (~q, 4C, Hγ Glu), 2.20–2.110 (m, 3H, Hβ Glu); 2.08–1.96 (~m, 1H, Hβ Glu); 1.72–1.60 (bs, 3H, Hγ Leu, Hβ Leu); 0.92; 0.88 (2d, J=5.6 Hz, 6H, $CH_3$ Leu) δ ppm
   NMR ($^{13}C$): 180.1 (s); 179.6 (s); 179.3 (s); 175.3 (s); 171.9 (s); 55.9 (d, Cα Glu); 55.1 (d, Cα Glu); 54.8 (d, Cα Leu); 42.4 (t, Cβ Leu); 32.8 (t, Cγ Glu); 32.2 (t, Cγ Glu); 29.1 (t, Cβ Glu); 28.9 (t, Cβ Glu); 27.4 (d, Cγ Leu); 25.1; 23.5 (2q, $CH_3$ Leu) δ ppm
   ESI-MS/MS: 390.5 ($Y_3$"); 372.3 ($B_3$); 354.4; 326.4; 261.2 ($Y_2$"); 259.2 ($B_2$); 241.1; 231.1($A_2$); 213.1; 195.2; 167.2; 132.1 ($Y_1$"); 102.1 ($A_1$); 86.1 (($Y_1'A_3$)$_1$)

5. GLu-Glu-Ile
   Yield: 57% ; Purity: 84.4%
   NMR ($^1H$, 360 MHz, $D_2O$): 4.47 (dd, $J_1$=8.4 Hz, $J_2$=6.0 Hz, 1H, Hα Glu); 4.13–4.07 (m, 2H, Hα Glu, Hα Ile); 2.44–2.32 (m, 4H, Hγ Glu); 2.18–2.07 (m, 3H, Hβ Glu); 2.01–1.91 (m, 1H, Hβ Glu); 1.88–1.79 (m, 1H, Hβ Ile); 1.48–1.37 (m, 1H, Hγ Ile); 1.22–1.10 (m, 1H, Hγ Ile); 0.90 (d, J=6.4 Hz, 3H, $CH_3$γ Ile); 0.87 (t, J=6.8 Hz, 3H, $CH_3$δ ) δ ppm
   NMR ($^{13}C$): 175.2 (s); 172.3 (s); 62.8 (d); 56.4 (d); 55.6 (d); 39.7 (d); 35.2 (t); 34.9 (t); 30.0 (t); 27.5 (t); 18.2 (q), 13.6 (q) δ ppm
   ESI-MS/MS, 390.5 ($Y_3$"); 372.4 ($B_3$); 354.4; 326.4; 259.1 ($B_2$); 241.1; 231.1 ($A_2$); 213.1; 167.1; 132.1 ($Y_1$"); 102.1 ($A_1$); 86.0 (($Y_1'A_3$)$_1$)

6. Asp-Glu-Ile
   Yield: 85% ; Purity: 88.2%
   NMR ($^1H$, 360 MHz, $D_2O$): 4.51 (dd, $J_2$=7.6 Hz, $J_2$=5.2 Hz, 1H); 4.37 (dd, $J_1$=7.2 Hz, $J_2$=5.2 Hz, 1H); 4.28 (d, J=6.0 Hz, 1H, Hα Ile); 3.04 (dd, $J_1$ 18.0 Hz, $J_2$ 5.2 Hz, 1H, Hβ Asp); 2.92 (dd, $J_1$=18.0 Hz, $J_2$=8.0 Hz, 1H, Hβ Asp); 2.51 (~t, 7.6 Hz, 2H, Hγ Glu); 2.19–1.98 (2m, 2H, Hβ Glu); 1.98–1.88 (m, 1H, Hγ Ile), 1.51–1.40 (m, 1H, Hβ Ile); 1.38–1.18 (m, 1H, Hβ Ile); 0.94 (d, J=6.8 Hz, 3H, $CH_3$γ Ile); 0.89 (t, J=7.2 Hz, 3H, $CH_3$δ Ile) δ ppm NMR ($^{13}$C). 180.0 (s); 178.2 (s); 176.3 (s); 175.5 (s); 171.5 (s); 60.8 (d); 55.9 (d); 52.6 (d); 39.2 (d); 38.3 (t); 32.8 (t); 29.2 (t); 27.6 (t); 17.9 (q); 13.5 (q) δ ppm ESI-MS/MS: 376.2 (Y$_3$"); 358.2 (B$_3$); 312.5; 261.5; 245.3 (B$_2$); 217.3; 181.3; 172.2; 132.2 (Y$_1$"); 102.0 ((Y$_3$'A$_2$)$_1$); 86.0 ((Y$_1$'A$_3$)$_1$)

7. Asp-Glu-Leu

Yield : 69% ; Purity : 81.8%

NMR ($^1$H, 360 MHz, D$_2$O). 4.47 (dd, J$_2$=8.0 Hz, J$_2$=6.0 Hz, 1H, Hα Glu); 4.39–4.33 (m, 2H, Hα Asp, Hα Leu); 3.20 (dd, J$_1$=18.4 Hz, J$_2$=5.2 Hz, 1H, Hβ Asp); 2.92 (dd, J$_1$=18.4 Hz, J$_2$=7.6 Hz, 1H, Hβ Asp); 2.51 (~t, J=6.0 Hz, 1H, Hγ Glu); 2.19–2.10 (m, 1H, Hβ Glu); 2.07–1.96 (m, 1H, Hβ Glu); 1.73–1.61 (m, 2H, Hβ Leu); 0.95; 0.90 (2d, J=5.6 Hz, 6H; CH$_3$ Leu) δ ppm NMR ($^{13}$C): 180.0 (s); 179.4 (s); 176.3 (s); 175.5 (s); 171.6 (s); 55.9 (d); 54.6 (d); 52.7 (d); 42.2 (d); 38.3 (t); 32.8 (t); 29.2 (t); 27.4 (d); 25.1 (q); 23.5 (q) δ ppm ESI-MS/MS: 376.3 (Y$_3$"); 358.1 (B$_3$); 298.2; 245.1 (B$_2$); 217.2; 181.2; 131.9 (Y$_1$"); 86.1 ((Y$_1$'A$_3$)$_1$)

8. Glu(Glu-Leu) or γGlu-Glu-Leu

Yield : 77% ; Purity : 90.2%

NMR ($^1$H, 360 MHz, D$_2$O): 4.42 (~t, J=5.2 Hz, 1H, Hα Leu); 4.37 (dd, J$_1$=9.2 Hz, J$_2$=6.4 Hz, 1H, Hα Glu); 4.00 (~t, J$_1$=6.0 Hz, 1H, Hα Glu); 2.58–2.47 (m, 4H, Hγ Glu); 2.21–2.16 (m, 2H, Hβ Glu); 2.16–2.07 (m, 1H, Hβ Glu); 2.03–1.94 (m, 1H, Hβ Glu); 1.73–1.62 (m, 3H, Hγ Leu, Hβ Leu); 0.93; 0.88 (2d, J=5.6 Hz, 6H, CH$_3$ Leu) δ ppm NMR ($^{13}$C): 179.9 (s); 179.1 (s); 177.2 (s); 176.4 (s); 175.1 (s); 55.9 (d); 55.7 (d); 54.3 (d); 33.9 (t); 32.8 (t); 29.1 (t); 28.7 (t); 27.3 (d); 25.1 (q); 23.4 (t) δ ppm ESI-MS/MS: 390.5 (Y$_3$"); 372.2 (B$_3$); 354.3; 327.3; 277.2; 261.2 (Y$_2$"); 259.1 (B$_2$); 243.1; 225.1; 213.1; 197.5; 148.2; 132.1 (Y$_1$"); 130.1 (B$_1$); 102.1 (A$_1$)

9. Glu-Glu-Val

Yield: 24% ; Purity : 88.0%

NMR ($^1$H, 360 MHz, D$_2$O): 4.52 (~t, J=6.4 Hz; 1H, Hα Glu); 4.25 (d, J=6.0 Hz; 1H, Hα Val); 4.13 (~t, J=6.4 Hz; 1H, Hα Glu); 2.52 (~dd, 2H, Hγ Glu); 2.24–2.13 (m, 2H, Hγ Glu); 2.13–2.08 (m, 3H, Hγ Glu, Hβ Val); 2.08–1.98 (m, 2H, Hβ Glu) δ ppm NMR ($^{13}$C): 180.0 (s); 179.2 (s); 178.2 (s); 175.6 (s); 172.0 (s); 61.8 (d); 55.9 (d); 55.1 (d); 32.9 (d); 32.8 (t); 32.1, (t); 29.2 (t); 28.9 (t); 21.3 (q); 20.2 (q) δ ppm ESI-MS/MS: 376.3 (Y$_3$"); 358.3 (B$_3$); 340.2; 312.3; 294.5; 259.3 (B$_2$); 241.2; 213.3; 195.1; 167.1; 129.2; 118.2 (Y$_1$"); 84.2; 72.1((Y$_1$'A$_3$)$_1$)

10. Glu-Leu-Glu

Yield: 73% ; Purity : 89.7%

NMR ($^1$H, 360 MHz, D$_2$O); 4.46–4.37 (m, 2H, Hα Glu; Hα Leu); 4.12 (~t, J=6.4 Hz, 1H, Hα Glu); 2.54 (~t, J=7.6 Hz, 2H, Hγ Glu); 2.48 (~t, J=7.6 Hz, 2H, Hγ Glu); 2.27–2.15 (m, 3H, Hβ Glu); 2.04–1.94 (m, 1H, Hβ Glu), 1.73–1.60 (m, 2H, Hβ Leu); 0.95; 0.91 (2d, J=5.6 Hz, 6H, CH$_3$ Leu) δ ppm NMR ($^{13}$C): 180.1 (s); 179.3 (s); 178.1 (s) 176.8 (s); 172.0 (s); 55.7 (d); 55.3 (d); 55.1 (d); 42.6 (t); 32.9 (t); 32.1 (t); 29.0 (t); 28.9 (t); 27.2 (d); 24.9 (q); 24.0 (q) δ ppm ESI-MS/MS: 390.3 (Y$_3$"); 372.5 (B$_3$); 354.5; 326.3; 261.2 (Y$_2$"); 243.4; 215.2; 197.2; 148.1; 130.2; 102.1 (A$_1$); 86.3 ((Y$_2$'A$_2$)$_1$)

11. Lys-Asp-Ile

Yield: 100% ; Purity: 89.5%

NMR ($^1$H, 360 MHz, D$_2$O): 4.82 (m / HDO, Hα Asp); 4.25 (d, J=5.6 Hz, 1H, Hα Ile); 4.06 (4t, J=6.4 Hz, 1H, Hα Lys); 3.00 (4t, J=7.2 Hz, 1H, Hε Lys); 2.94 (dd, J$_1$=16.8 Hz, J$_2$=5.6 Hz, 1H, Hβ Asp); 2.82 (dd, J$_1$=16.8 Hz, J$_2$=8.4 Hz, 1H, Hβ Asp); 1.96–1.89 (m, 3H, Hβ Lys, Hβ Ile); 1.76–1.68 (m, 2H, Hδ Lys); 1.50–1.40 (m, 3H, Hγ Lys, Hγ Ile); 0.94 (d, J=6.4 Hz, 3H, CH$_3$γ Ile); 0.89 (t, J=7.2 Hz, 3H, CH$_3$δ Ile) δ ppm NMR ($^{13}$C): 178.3 (s); 176.9 (s); 174.7 (s); 172.3 (s); 60.9 (d); 55.7 (d); 53.2 (d); 41.9 (t); 39.3 (d); 38.5 (t); 33.3 (t); 29.2 (t); 27.5 (t); 24.1 (t); 18.0 (q); 13.6 (q) δ ppm

DCI (NH$_3$)-MS; 375; 357; 149; 132

12. Asp-Ile-Gly

Yield : 23% ; Purity: 87.2%

NMR ($^1$H, 360 MHz, D$_2$O): 4.32 (dd, J$_1$=8.4 Hz, J$_2$=5.2 Hz, 1H, Hα Asp); 4.25 (d, J=7.2 Hz, 1H Hα Ile); 3.78 (bs, 2H, Hα Gly); 2.87 (dd, J$_1$=16.8 Hz, J$_2$=5.2 Hz, 1H, Hβ Asp); 2.71 (dd, J$_1$=16.8 Hz, J$_2$=8.4 Hz, 1H, Hβ Asp); 1.95–1.86 (m, 1H, Hβ Ile); 1.55–1.45 (m, 1H, Hγ Ile); 1.37–1.14 (m, 1H, Hγ Ile); 0.96 (d, J=6.8 Hz, 3H, CH$_3$γ Ile); 0.89 (t, J=6.8 Hz, 3H, CH$_3$γ Ile) δ ppm NMR ($^{13}$C): 175.7 (s); 172.5 (s); 61.7 (d, Cα Ile); 53.6 (d, Cα Asp); 46.1 (t, Cα Gly); 40.1 (t, Cβ Asp); 39.2 (d, Cβ Ile); 27.4 (t, Cγ Ile); 17.7 (q, CH$_3$γ Ile); 13.3 (q, CH$_3$δ Ile) δ ppm ESI-MS/MS: 304.3 (Y$_3$"); 286.3 (B$_3$); 229.2 (B$_2$); 201.3 (B$_2$); 141.0; 86.2 ((Y$_2$'A$_2$)$_1$)

The amino acid derivatives of structure Lac-X were prepared in a manner similar to that described above for the tripeptides, a single coupling reaction between the appropriate protected amino acid and (+)-(S)-lactic acid (Fluka), in the presence of one equivalent of PyBOP® and excess diisopropyl ethylamine, being required in this case. After the intermediate protected peptide ester had been purified and the protecting group had been removed as described in C, the desired N-(S)-lactoyl-X derivatives, where X is an amino acid residue, were isolated.

The following intermediate and final products were prepared:

13. N-(S)-Lactoyl-Glu

NMR ($^1$H, 360 MHz, D$_2$O); 1.38 (d, 6.8, lactoyl CH$_3$), 2.08, 2.27 (ABX$_2$Y, Glu 2 H—Cβ), 2.50 (t deformed, Glu 2 H—Cγ), 4.30 (q, 6.8, lactoyl H—C—O), 4.50 (dd, 10, 4.8, Glu H—Cα,) δ ppm NMR ($^{13}$C) : 22.56 (q, lactoyl CH$_3$), 28.56 (t), 32.97 (t), 54.54 (d), 70.62 (d), 171.72, 180.00 and 180.63 (3s, C=O) δ ppm ESI-MS/MS: 220 (M+I), 202, 184, 174 (M-45), 148 (M-lactoyl), 130, 102, 84, 45

The analytical characteristics of the intermediate dibenzyl ester, namely N-(S)-lactoyl-Glu(OBzl)-OBzl, were as follows:

NMR ($^1$H, 360 MHz, D$_2$O): 1.38 (d, 6.8, lactoyl CH$_3$), 2.05, 2.25 (ABX$_2$Y, Glu 2 H—Cβ), 2.40 (ABXY, Glu 2 H—Cγ), 4.20 (q, 6.8, lactoyl H—C—O), 4.65 (m, Glu H—Cα), 5.09 and 5.14 (2s, 2×2 H—C-arom.), 7.35 (m, 10 H-arom.) δ ppm NMR ($^{13}$C) ; 20.93 (q, lactoyl CH$_3$); 0.27.06 (t), 30.28 (t), 51.27 (d), 66.65 (t), 67.47 (t), 68.24 (d), app. 128.5 (Sd), 135.09 and 135.64 (2s, quaternary arom. C), 171.75, 172.58 and 175.07 (3s, C=O) δ ppm DCI (NH$_3$)-MS: m/e 417 (M+18), 400 (M+1)

14. N-(S)-Lactoyl-Ala

NMR (1H, 360 MHz, D$_2$O): 1.36 and 1.40 (2d, 7.2, lactoyl CH$_3$ and Ala 3 H—Cβ), 4.30 (m, Lactoyl H—C—O, Ala H—Cα) δ ppm NMR ($^{13}$C): 19.71 (q), 22.48 (q), 52.11 (d), 70.56 (d), 180.02 and 180.5 (2s, 2 C=O) δ ppm ESI-MS/MS: 162 (M+1), 116 (M-45), 90 (M-lactoyl), 44

The analytical characteristics of the intermediate benzyl ester, namely N-(S)-lactoyl-Ala-OBzl, where as follows:

NMR ($^1$H, 360 MHz, D$_2$O): 1.42 and 1.46 (2d, 6.4, lactoyl CH$_3$ and Ala 3 H—Cβ), 3.0 (s broad, H—O), 4.26 (q, 6.4, lactoyl H—C—O), 4.64 (dq, 7.2, 6.4, Ala H—Cα), 5.18 (AB, 11.2, 2 H—C-arom.), 7.04 (d, 7.2, H—N), 7.35 (m, 5 H—C-arom.) δ ppm NMR ($^{13}$C) : 18.18 (q), 20.89 (q), 47.67 (d), 67.30 (t), 68.26 (d), 128.16, 128.50, 128.67 (3d), 135.27 (s, quaternary arom. C), 172.98 and 174.43 (2s, C=O) δ ppm

DCI (NH$_3$)-MS: 269 (M+18), 252 (M+1)

15. N-(S)-Lactoyl-Leu

NMR ($^1$H, 360 MHz, D$_2$O): 1.39 and 1.42 (2d, 5.3, Leu 6 H—C6), 1.36 (d, 6.6, lactoyl CH$_3$), 1.65 (m, 2 H—Cβ, H—Cγ), 4.28 (q, 6.6, lactoyl H—C—O), 4.32 (m, Leu H—Cα) δ ppm NMR ($^{13}$C): 22.55 (q), 23.68 (q), 25.28 (q), 27.50 (d), 43.13 (t), 55.33 (d), 70.69 (d), 180.10 and 181.37 (2s, 2 C=O) δ ppm

ESI-MS/MS: 221 (M+18) 0.204 (M+H)

The analytical characteristics of the intermediate benzyl ester, namely N-(S)-lactoyl-Leu-OBzl, were as follows:

NMR ($^1$H, 360 MHz, D$_2$O): 0.83 and 0.88 (2d, 2 Cδ of Leu), 1.20 (d, 6.6, lactoyl CH$_3$), 1.57 and 1.70 (2 m, H—Cγ and Leu 2 H—Cβ), 4.02 (m, lactoyl H—C—O), 4.40 (m Leu H—Cα), 5.13 (AB, 11.2, 2 H—C-arom.), 5.51 (d, 5.3 H—O), 7.35 (m, 5 H—C arom.) 7.90 (d, 7.9, H—N) δ ppm NMR ($^{13}$C) : 21.03 (q, Lac CH$_3$), 21.24, 22.68 (2q, Leu 2 Cδ), 24.22 (d, Leu Cγ), 39.47 (t), 49.83 (d, Leu Cα), 65.98 (t, Bzl C), 66.98 (d, Lac CH), 127.73, 127.96, 128.35 (3d), 135.89 (s, quaternary arom. C), 172.14 and 174.57 (2s, C=O) δ ppm

DCI (NH$_3$)-MS : 311 (M+18), 295 (M+1)

16. N-(S)-Lactoyl-Tyr

Yield: 43%

NMR ($^1$H, 360 MHz, D$_2$O):7.14 (d, J=8.4 Hz, 2H, Ph Tyr); 6.86 (d, J=8.4 Hz, 2H, Ph Tyr); 4.68 (dd, J=8.4 Hz, J$_2$=5.2 Hz, 1H Ha Tyr); 4.21 (q, J=6.8 Hz, 1H, Ha Lac); 3.21 (dd, J$_1$=14.0 Hz, J$_2$=5.2 Hz, 1H, Hβ Tyr); 2.98 (dd, J$_1$=14.0 Hz, J$_2$=8.4 Hz, 1H, Hβ Tyr); 1.22 (d, J=6.8 Hz, 1H, Lac CH$_3$) δ ppm NMR ($^{13}$C): 180.1 (s); 177.6 (s); 157.4 (s); 133.6 (d); 131.2 (s); 118.4 (d); 70.6 (d); 56.3 (d); 38.7 (t); 22.4 (q) δ ppm ESI-MS/MS: 254.2 (Y$_2$"); 208.2 (A$_2$): 182.5 (Y$_1$"); 164.9; 136.1 ((Y$_1$'A$_2$)$_i$); 123.0; 45.2

The analytical characteristics of the intermediate benzyl ester, namely N-(S)-lactoyl-Tyr-OBzl, where as follows:

NMR ($^1$H, 360 MHz, D$_2$O): 9.24 (bs, 1H, OH Tyr); 7.78 (d, J=8.0 Hz, NH Tyr); 7.40–7.8 (m, 5 H , Bzl); 6.93 (d, J=8.4 Hz, 2 H, Ph Tyr); 6.74 (d, J=8.4 Hz, 2H, Ph Tyr); 5.58 (d, J=6.8 Hz, 1H; OH Lac); 5.14; 5.08 (AB, J=14.4 Hz, 2H, CH$_2$ Bzl); 4.53 (~dd, J$_1$=8.0 Hz, J$_2$=6.8 Hz, 1H Hα Tyr); 4.01–3.93 (m, 1H Hα Lac); 2.96 (m, 2H, Hβ Tyr) ; 1.13 (d, J=6.8 Hz; 3H, Lac CH$_3$) δ ppm NMR ($^{13}$C): 174.3 (s); 171.2 (s); 156.0 (s); 135.7 (s); 130.1 (d, Ph Tyr); 128.3; 128.0; 127.9 (3d, Bzl); 126.6 (s); 115.0 (d; Ph Tyr); 66.9 (d, Cα Lac); 66.0 (t, CH$_2$ Bzl); 52.9 (d, Cα Tyr); 35.8 (t, Cβ Tyr); 20.9 (q, Lac CH$_3$) δ ppm DCI (NH$_3$)-MS: 361 (M+NH$_4$$^+$); 344 (M+H$^+$); 272 (M-Lac); 253

17. N-(S)-Lactoyl-Met

The synthesis of this compound was slightly different from that of the other analogues. After a coupling reaction between L-methionine methyl ester hydrochloride (Aldrich) with (+)-(S)-lactic acid in the presence of PyBOP® in dichloromethane and diisopropyl ethylamine, kept at 25° using an ice bath, the mixture was diluted in ethyl acetate and treated as described above under A. The residue after vacuum evaporation was filtered on silica gel using ethyl acetate to remove the tripyrrolidinophosphine oxide (a by-product of the PyBOP® reaction). The filtrate was concentrated and purified by flash chromatography on silica gel using 35:65 hexane/ethyl acetate, followed by 3:7 hexane/ethyl acetate and finally ethyl acetate as eluent. The chromatographically pure fractions (TLC) were combined and concentrated to provide the intermediate methyl ester, namely N(S)-lactoyl-Met-OCH$_3$, having the following analytical characteristics:

NMR ($^1$H, 360 MHz, D$_2$O): 1.43 (d, 6.4, lactoyl CH$_3$ ), 2.02, 2.20 (ABX$_2$Y, Met 2 H—Cβ), 2.10 (s, 3 H—C—S), 2.53 (t, 7.2, Met 2 H—Cγ), 3.22 (broad s, H—O), 4.27 (q, 6.4, lactoyl H—C—O), 4.71 (m, Met H—Cα), 7.2 (d, 9.2, H—N) δ ppm NMR ($^{13}$C): 15.52 (q), 21.04 (q, lactoyl CH$_3$), 30.03 (t), 31.63 (t), 51.12 (d), 52.66 (q), 68.24 (d), 172.5, 175.0, (2s, C=O) δ ppm DCI (NH$_3$)-MS: 3m/e 253 (M+18), 236 (M+1)

The intermediate methyl ester (10 mmole) was then saponified using sodium hydroxide (21 mmole) in a mixture of water (20 ml) and ethanol (10 ml). The ethanol was evaporated under vacuum and the aqueous phase was diluted with water (100 ml) and extracted twice with ether. The pH of the aqueous phase was adjusted to 5.5 and freeze dried. After being desalted on a Dowex® (50W×8 (Fluka) resin, the desired N-(S)-lactoyl-Met was obtained in the form of a viscous yellow oil. The pH of the latter was adjusted to 5.5 using 0.2N NaOH in order to obtain the desired product in the form of a crystalline powder whose analytical characteristics were as follows:

NMR ($^1$H, 360 MHz, D$_2$O): 1.38 (d, 6.8, lactoyl CH$_3$ ), 2.02, 2.14 (ABX$_2$Y, Met 2 H—Cβ), 2.12 (s, 3 H—C—S), 2.55 (m, Met 2 H—Cγ), 4.28 (q, 6.8, lactoyl H—C—O), 4.33 (dd, 8.8, 4.8, Met H—Cα) δ ppm NMR ($^{13}$C): 17.06 (q), 22.49 (q, lactoyl CH$_3$), 32.46 (t), 33.92 (t), 56.55 (d), 70.60 (d), 179.75 and 180.99 (2s, C=O) δ ppm ESI-MS/MS: m/z 222: 222 (M+1), 205, 176 (M-45), 174, 150 (M-lactoyl), 128, 104, 61, 56

The invention will now be described in greater detail using the following examples in which the abbreviations have the usual meanings in the art. These examples represent typical ways of carrying out the invention which should not be interpreted restrictively, in particular as regards the relative or absolute proportions of the ingredients mentioned.

EXAMPLE 1

Preparation of flavouring compositions

Two base solutions were prepared by adding the following ingredients to spring water in the proportions indicated (weight of ingredient in mg per liter of solution):

| Ingredient | Solution | |
|---|---|---|
| | A | B |
| Na$_2$PO$_4$ | 67.5 | 67.5 |
| CaO | 130.0 | 130.0 |
| KCl | 65.0 | 65.0 |
| MgO | 16.0 | 16.0 |
| NH$_4$Cl | 184.5 | 184.5 |
| NaCl | 221.5 | 221.5 |
| NaOH | 189.5 | 189.5 |
| HCl | 219.0 | 219.0 |
| Lactic acid | 492.0 | 492.0 |
| Flavouring* | — | 50.0 |
| Total | 1585.0 | 1635.0 |

*504262 TH, cheese type, Origin: Firmenich SA

Using these base solutions, further flavoured solutions were prepared by adding the compounds mentioned in the tables below to one or other of the solutions A or B in a concentration of 0.3% by weight with respect to the volume of the solution, together with the necessary amount of 0.2M NaOH (approximately 2 to 5 ml) to buffer the pH of the final solution to approximately 5.5.

TABLE I

Solutions prepared using base solution A

| Solution | Ingredient |
|---|---|
| C | Glu-Glu-Leu |
| D | Leu-Glu-Glu |
| E | Glu-Glu-Ile |
| F | Glu-Glu-Val |
| G | γGlu-Glu-Leu |
| H | Glu-Asp-Ile |
| I | Glu-Asp-Phe |
| J | Asp-Glu-Ile |
| K | Asp-Glu-Leu |
| L | Glu-Leu-Glu |
| M | Lac-Glu |
| N | Lac-Leu |
| O | Lac-Ala |
| P | Lac-Met |

TABLE II

Solutions prepared using base solution B

| Solution | Ingredient |
|---|---|
| C' | Glu-Glu-Leu |
| D' | Leu-Glu-Glu |
| E' | Glu-Glu-Ile |
| F' | Glu-Glu-Val |
| G' | γGlu-Glu-Leu |
| H' | Glu-Asp-Ile |
| I' | Glu-Asp-Phe |
| J' | Asp-Glu-Ile |
| K' | Asp-Glu-Leu |
| L' | Glu-Leu-Glu |
| M' | Lac-Glu |
| N' | Lac-Leu |
| O' | Lac-Ala |
| P' | Lac-Met |

The novel solutions so obtained were then evaluated on a blind test by a panel of flavour experts in two separate tests.

The purpose of the first of these tests was to describe the organoleptic properties of solutions C to P and to compare them with those of base solution A. The results of this test are indicated in Table III below.

TABLE III

Evaluation with respect to solution A

| Solution | Organoleptic properties |
|---|---|
| C | excellent mouthfeel, slightly woody musty note, round, sweet |
| D | a little less mouthfeel than C, neutral |
| E | mouthfeel, fruity, ether note |
| F | rounded, oily |
| G | strong musty note, mouthfeel |
| H | creamy, rounded, slightly bitter |
| I | more umami than H, mouthfeel |
| J | powdery, cardboard-like |
| K | slightly salty, umami and bitter, mouthfeel |
| L | slightly salty, umami and sweet |
| M | iodised marine note, mouthfeel, caramel odour, fresh |
| N | slightly bitter, mouthfeel |
| O | mouthfeel, but slightly less than M, also less iodated |
| P | rounded, cheesy, dairy product, almost overdosed, earthy, geranium odour |

In general it was found that all the solutions C to P had a more rounded taste and caused a rich mouthfeel which is markedly improved with respect to that of base solution A. The flavour experts also indicated a marked preference for solutions C and D, among solutions C to L containing tripeptides, for their more marked roundness and mouthfeel, and also for their organoleptic effect which is more reminiscent of that provided by MSG (monosodium glutamate).

On the other hand, among solutions M to P, it appeared that solutions M and O caused a richer mouthfeel, solution P also having a highly valued character of the cheese type.

The results of the second comparative test are summarised in Table IV. The flavour experts were to give their opinions on the organoleptic properties of solutions C' to P' in comparison with those of solution B, which had a typical cheesy taste imparted by the volatile flavour, but very few creamy notes and little mouthfeel.

TABLE IV

Evaluation in comparison with solution B

| Solution | Organoleptic properties |
|---|---|
| C' | excellent mouthfeel, increase in the cheesy notes, neutral effect on the taste imparted by the volatiles |
| D' | similar to C', appreciably enhanced notes of the cheesy and butter type, very rounded taste |
| E' | more mouthfeel, but a less marked effect that C' and D' |
| F' | more rounded taste, more of molten cheese, a slight burnt note, mouthfeel similar to C' and D' |
| G' | more mouthfeel, a slightly phenolic note |
| H' | an increased creamy effect |
| I' | filled the mouth, a very pronounced umami effect |
| J' | a more salty taste |
| K' | more impact in the mouth, mouthfeel, more rounded and salty |
| L' | a more rounded and salty taste, enhances the volatiles, fatty notes also increased |
| M' | more impact and volume in the mouth, a fresher taste, more perceptible odour |
| N' | more mouthfeel |
| O' | more mouthfeel, over-concentrated, covering the volatiles, lasting taste in the mouth, stronger odour |
| P' | excessively strong concentration, taste very much more creamy, more lasting, excellent mouthfeel |

In the opinion of the flavour experts, all the new solutions obtained gave a fuller and more lasting taste in the mouth than base solution B, the addition of the compounds mentioned in Table II in general having served to strengthen the cheesy taste of the latter and to confer a fuller more creamy consistency upon it. Of all the solutions containing tripeptides, solutions C', D' and F' were particularly valued for their mouthfeel, and an umami character reminiscent of the effect which can be obtained with MSG. According to the flavour experts, this effect of the MSG type obtained with these tripeptides could be increased still further by using them in combination with succinic acid. Among these three new solutions, solution C' was the most preferred, its taste being very balanced, with a good mouthfeel, but without any distortion of the cheese flavour profile being observed.

Furthermore, solutions M' and O' were preferred for the fullness and impact of their taste, and solution P' was felt to be particularly useful for flavourings of the cheese type. In the case of the compound Lac-Ala present in solution O', it was found that its organoleptic effect became even better if this compound was added at 0.075% by weight instead of 0.3%, the volatiles then producing their maximum effect and the solution still having an excellent mouthfeel. Similarly, compound Lac-Met in solution P' was at its best at concentrations below the 0.3% mentioned above. It was in fact found that even when used at 0.15% or again at 0.1% by weight it always conferred satisfactory creaminess and a fullness of taste upon the base solution, making it more lasting, and better strengthening the volatile notes of the cheesy flavour.

EXAMPLE 2

Preparation of flavouring compositions

The basic flavouring composition was prepared by mixing the following amino acids in the proportions indicated (parts by weight):

| Ingredient | Parts by weight |
|---|---|
| L-Alanine | 2.98 |
| Glycine | 3.72 |
| L-Valine | 7.87 |
| L-Threonine | 0.98 |
| L-Serine | 4.90 |
| L-Leucine | 9.91 |
| L-Isoleucine | 7.34 |
| L-Cysteine | 0.50 |
| L-Proline | 9.72 |
| L-Methionine | 2.23 |
| L-Asparagine | 3.43 |
| L-Aspartic acid | 3.43 |
| L-Phenylalanine | 5.25 |
| L-Ornithine | 0.12 |
| L-Glutamic acid | 15.95 |
| L-Glutamine | 11.83 |
| L-Lysine | 8.08 |
| L-Tyrosine | 1.06 |
| L-Histidine | 0.48 |
| L-Tryptophane | 0.22 |
| Total | 100.00 |

A base flavouring solution X was prepared by adding 0.2% by weight of this flavouring composition based on amino acids, with respect to the volume of the solution, to solution B described in Example 1. The pH of this solution was adjusted to approximately 5.5 using 0.2M NaOH.

Using this base solution X, which had a flavour note of the cheesy type, slightly musty and salted, and some mouthfeel, together with a stronger taste and more volume than solution B, new flavouring solutions were prepared by adding the tripeptides indicated in the Table below at a level of 0.1% by weight with respect to the volume of the solution, together with the necessary amount of 0.2M NaOH (approximately 2 to 5 ml) to buffer the pH of the final solution at approximately 5.5.

TABLE V

| Solutions prepared using base solution X | |
|---|---|
| Solution | Ingredient |
| C" | Glu-Glu-Leu |
| D" | Leu-Glu-Glu |
| E" | Glu-Glu-Ile |
| F" | Glu-Glu-Val |
| G" | γGlu-Glu-Leu |
| H" | Glu-Asp-Ile |
| I" | Glu-Asp-Phe |
| J" | Asp-Glu-Ile |
| K" | Asp-Glu-Leu |
| L" | Glu-Leu-Glu |

These flavoured solutions were then blind evaluated by a panel of flavour experts who had to describe their taste and evaluate them with respect to base solution X. The table below summarises the results of these evaluations.

TABLE VI

| Evaluation with respect to solution X | |
|---|---|
| Solution | Organoleptic properties |
| C" | excellent mouthfeel, more roundness, umami, filled the mouth in a remarkable fashion, an impression of saltiness |
| D" | excessively pronounced mouthfeel, volatiles slightly crushed, dosage to be revised, but creaminess and volume appreciably increased, odour more intense than the base solution |
| E" | more rounded taste |
| F" | more rounded salty taste |
| G" | more mouthfeel, a slightly less phenolic note |
| H" | a more creamy, less cheesy taste |
| I" | filled the mouth more, more mouthfeel, roundness, umami |
| J" | more rounded taste |
| K" | more rounded taste |
| L" | well-balanced taste, a feeling of fullness |

A net preference for solutions C", D" and L" appeared from these tests, despite the fact that the dosage in solution D" was not ideal. In the opinion of the flavour experts the flavouring composition based on amino acids had added fullness to the taste of solution B, but it was the addition of the tripeptides, in particular the compounds Glu-Leu-Glu, Leu-Glu-Glu and Glu-Glu-Leu, which provided the ideal fullness, in particular for applications of the cheesy and dairy product type in general. The effect of these compounds, in combination with the mixture of amino acids, was particularly strong from the point of view of mouthfeel, or the feeling of the solution in the mouth, but nevertheless different from that of MSG, less in the nature of a stock, more like "neutral umami", so to speak, which makes them more generally applicable.

EXAMPLE 3

Flavouring of instant soups of the vegetable type

Samples of a soup flavoured by adding tripeptides according to the invention to commercial packet soups of the instant type, of the Royco® tomato and parsley type (origin: Fralib, France), were prepared.

In order to do this, solutions of the said tripeptides (50 mg) were prepared in spring water, to which a few drops of 0.2M NaOH were added in order to bring the pH to approximately 5.0 (final volume 5 ml) and freeze-drying the solution if necessary in order to obtain a tripeptide powder, or using this solution as such.

The soups were then prepared in accordance with the manufacturer's instructions, by diluting a quarter of a Royco® packet (approximately 4.34 g of homogeneous powder) in boiling water (reference soup) together with the ingredients indicated below:

| | | Soup | | | |
|---|---|---|---|---|---|
| Ingredient | Reference | A | B | C | MSG |
| Boiling water | 50 ml | 50 ml | 45 ml | 45 ml | 50 ml |
| Royco ® Powder | ¼ packet | ¼ packet | ¼ packet | ¼ packet | ¼ packet |
| Glu-Glu-Leu | — | 50 mg (freeze dried) | — | — | — |
| Leu-Glu-Glu | — | — | 5 ml (pH 5 solution) | — | — |

17
-continued

| Ingredient | Soup | | | | |
|---|---|---|---|---|---|
| | Reference | A | B | C | MSG |
| Glu-Asp-Phe | — | — | — | 5 ml (pH 5 solution) | — |
| MSG | — | — | — | — | 50 mg |

The boiling soups prepared in this way were then blind evaluated by a panel of flavour experts. In the opinion of the latter, all these soups had a less fruity odour than the reference soup, the MSG soup having an odour rather more like that of stock.

Soup A had a more rounded and sweeter taste, and was also less acid than the reference soup and had more volume, without the odour being appreciably affected, the entire effect being felt in the mouth.

A marked preference was indicated for soup B, whose taste was felt to be more rounded and whose impact was felt to be better than the one above, with a longer lasting tomato taste in the mouth.

The MSG soup was preferred to soup C, its impact being similar to that of soup B, from the point of view of fullness, but covering up too much the tomato character, which gave it a less natural and authentic taste than that of soup B. According to the flavour experts, this illustrated the fact which had already previously been noted that MSG has an umami effect of the stock type, whereas the tripeptides according to the invention, in particular Leu-Glu-Glu and Glu-Glu-Leu, have a neutral umami effect, affecting the volatiles less.

As for soup C, its odour was more of the concentrated tomato type, which was valued, the spicy notes of the dill and carvone type being however enhanced, causing a slight distortion in the original tomato character. In the opinion of these flavour experts, the tripeptide added in this case, namely Glu-Asp-Phe, caused an organoleptic effect which proved ideal for use in a cream of asparagus, for example, but was less liked than the other two mentioned above for an effect of the tomato type.

EXAMPLE 4

Flavouring of instant chicken stocks

Samples of a flavoured chicken stock were prepared using a chicken stock cube of the Knorr® type, adding tripeptides in a manner similar to that described in Example 3.

To do this, solutions of the said tripeptides (50 mg) were prepared in spring water, to which a few drops of 0.2M NaOH were added to bring the pH to approximately 5.0 (final volume 5 ml), and if necessary the solution was freeze dried to obtain a tripeptide powder, or the solution was used as such.

The soups were then prepared by diluting a cube of the Knorr® type in 500 ml of boiling water to prepare a basic stock to which the ingredients indicated below were then added.

18

| Ingredient | Soup | | | | |
|---|---|---|---|---|---|
| | Reference | A | B | C | MSG |
| Base stock | 50 ml | 50 ml | 45 ml | 45 ml | 50 ml |
| Glu-Glu-Leu | — | 50 mg (freeze dried) | — | — | — |
| Leu-Glu-Glu | — | — | 5 ml (pH 5 solution) | — | — |
| Glu-Asp-Phe | — | — | — | 5 ml (pH 5 solution) | — |
| MSG | — | — | — | — | 50 mg |

The boiling stocks prepared in this way were then blind evaluated by a panel of flavour experts.

In their opinion, stock A had an excellent odour and a taste in which the stock note was appreciably strengthened and was more lasting than that of the base or reference stock.

Its taste was lasting and rounded, and full. Also, this stock was preferred by all the flavour experts.

Stock B had a taste which was felt to be more rounded but a little hollow, with more volume but a little less character than the base stock. The MSG stock was in fact preferred for its fuller, more rounded and more meaty taste.

Similar tests were performed using a chicken stock cube of the Maggi® "light" type, with 50% less fat. In this special case it was the tripeptide Leu-Glu-Glu which provided the best organoleptic effect, providing a stock with a more velvety, more rounded juicy meat taste, the effect being judged to be entirely comparable with that obtained using MSG.

EXAMPLE 5

Flavouring of low fat margarines 20 mg of the tripeptide Glu-Glu-Leu (margarine A), 20 mg of the tripeptide Leu-Glu-Glu (margarine B) and 20 mg of MSG (margarine MSG) were added respectively to 20 g of a commercial low-fat margarine (Mabona minima, Migros, Switzerland, 25% fat).

The new margarines so obtained were then evaluated blind by a panel of flavour experts and compared with the commercial margarine, whose flavour was described by the flavour experts as being creamy, milk powder, with a gelatinous consistency which was not long-lasting in the mouth.

The result of this evaluation showed a net preference by the flavour experts for margarine B, closely followed by margarine A. The latter had a very much longer-lasting taste and fuller taste in the mouth than the commercial margarine, the milk powder note was completely masked, and it gave the impression of having a greater richness of fat. However margarine B was of a still better quality, more creamy and unctuous, more substantial, the flavour being better respected, the butter and margarine notes being more natural and the overall effect being even more balanced.

These effects were again quite identifiable even with a lower concentration of tripeptide, of the order of 0.05% by weight with respect to the weight of margarine.

As for the MSG margarine, its taste was considered to be too stock-like, although the mouthfeel effect was comparable to that of margarine B. The stock note was in fact so strong that it completely destroyed the overall organoleptic effect.

EXAMPLE 6

Flavouring compositions of the fish or shellfish type

In order to prepare flavoured base solutions, a smoked fish type flavour (502.983 A; origin: Firmenich SA, Geneva, Switzerland; solution A), a flavour of the crab type (504.483 A; origin: Firmenich SA, Geneva, Switzerland; solution B), a flavour of the squid type (503.044 A; origin: Firmenich SA, Geneva, Switzerland; solution C) and a flavour of the shrimp type (503.042 A; origin: Firmenich SA, Geneva, Switzerland; solution D) respectively, were added to a saline aqueous solution containing 0.5% of NaCl, all these flavours being added in the proportion of 0.01% by weight.

0.3% by weight of the tripeptide Glu-Glu-Leu or 0.03% by weight of the Lac-Met derivative according to the invention were then added to these base solutions to obtain new flavoured solutions which were evaluated blind in comparison with the corresponding base solutions by a panel of flavour experts.

The result of these evaluations showed that the Glu-Glu-Leu compound strengthened the mouthfeel and provided more volume to the basic flavours, an effect which was particularly marked in the case of flavours of the smoked fish, crab and shrimp type.

On the other hand, the Lac-Met derivative rounded out the taste and provided more body and fullness to the solution containing the flavour of the smoked fish type.

EXAMPLE 7

Flavouring compositions of the exotic fruits type

A flavour of the pineapple type (502.434 A; origin: Firmenich SA, Geneva, Switzerland), a flavour of the mango type (55.508 A; origin: Firmenich SA, Geneva, Switzerland), a flavour of the passion fruit type (502.010 A; origin: Firmenich SA, Geneva, Switzerland), and a flavour of the guava type (503.741 A; origin: Firmenich SA, Geneva, Switzerland) were added respectively in a concentration of 0.01% by weight to acidified sugar water (10% sugar, 0.1% citric acid) to prepare base solutions.

0.3% by weight of Glu-Glu-Leu was then added to these four base solutions to prepare new flavoured solutions according to the invention which were compared on a blind test with the corresponding base solutions by a panel of flavour experts.

According to the opinion of the latter, the new solutions, in particular those having the pineapple and mango flavours, had a clearer fruit flesh and more pulpy note than the corresponding base solutions, and were therefore preferred to them.

EXAMPLE 8

Flavouring of chips

Powder flavouring compositions A and B were prepared using the following ingredients.

| Ingredient | Composition A | (% by weight) B |
|---|---|---|
| Tomato type flavour | 0.20 | 0.20 |
| Salt | 14.40 | 14.40 |
| Sugar | 32.00 | 32.00 |

-continued

| Ingredient | Composition A | (% by weight) B |
|---|---|---|
| Malic acid | 1.60 | 1.60 |
| Sodium acetate | 3.20 | 3.20 |
| Sodium diacetate | 3.20 | 3.20 |
| Paprika resin oil | 1.20 | 1.20 |
| Onion powder | 4.80 | 4.80 |
| Garlic powder | 0.80 | 0.80 |
| MSG | 9.60 | — |
| Maltodextrin | 29.00 | 34.60 |
| Glu-Glu-Leu | — | 4.00 |
| Total | 100.00 | 100.00 |

*728 418 AP; origin: Firmenich SA, Geneva, Switzerland

Two separate lots of potato chips were then flavoured using these two compositions, using conventional coating techniques.

When the two lots of chips flavoured in this way were evaluated on a blind test by a panel of flavour experts, the latter indicated that the two lots of chips had a good mouthfeel and an impact in the mouth which was quite comparable from the point of view of its strength.

EXAMPLE 9

Flavouring of a cheese sauce

A base cheese sauce was prepared using the following ingredients:

| Ingredients | Parts by weight |
|---|---|
| Water | 300.00 |
| Flour | 9.1 |
| Modified starch | 5.0 |
| Fat | 4.0 |
| Powdered milk | 6.0 |
| Onion powder | 0.3 |
| Pepper | 0.1 |
| Nutmeg | 0.1 |
| Powdered mustard | 0.3 |
| Salt | 3.1 |
| Cheese powder* | 6.6 |
| Cheese powder** | 3.2 |

*cheddar type, 871009/P; origin: Firmenich NV, Maasmechelen, Belgium
**mozzarella type871013/P; origin: Firmenich NV, Maasmechelen, Belgium After the abovementioned ingredients had been mixed, a sauce was prepared in the conventional way adding water in the appropriate quantity and heating to boiling, while mixing well in order to obtain a uniform sauce.

0.25% by weight of the tripeptide Glu-Glu-Leu was then added to this ready-for-use base sauce in order to obtain a new sauce flavoured in accordance with the invention.

The base sauce and the new sauce were then evaluated blind by a panel of flavour experts. The latter indicated a clear preference for the new sauce. In their opinion, addition of the abovementioned tripeptide to the base sauce, whose original taste was slightly bitter and spicy, like the rind of gruyere cheese, had given it a more creamy and meaty note and had rounded and softened its impact in the mouth.

We claim:

1. A method to improve, the organoleptic properties of a flavored composition or a flavored product, which method comprises adding to said composition or product:

a) one or more tripeptides containing a hydrophobic amino acid residue and at least one acidic amino acid residue, or b) one or more amino acid derivatives having an N-lactoyl-X structure, where X represents an amino acid residue.

2. A method according to claim 1, wherein said tripeptide or amino acid derivative is added to a product which can be eaten by man or animals, in a sufficient quantity to impart, improve or increase the mouthfeel of the said product.

3. A method according to claim 1, wherein the tripeptide contains two acidic amino acid residues.

4. A method according to claim 1, wherein the acidic residue or residues of the tripeptide are glutamyl residues.

5. A method according to claim 4, wherein the tripeptide is selected from the group consisting of Glu-Glu-Leu, Glu (Glu-Leu), Leu-Glu-Glu, Glu-Asp-Phe, Glu-Glu-Ile, Asp-Glu-Leu and Glu-Leu-Glu.

6. A method according to claim 1 wherein the amino acid derivative is selected from Lac-Glu, Lac-Ala and Lac-Met.

7. A method according to claim 1, wherein the tripeptide and/or amino acid derivative is used in admixture with one or more amino acids.

8. A flavoring composition containing as a flavoring ingredient:
   a) one or more tripeptides containing a hydrophobic amino acid residue and at least one acidic amino acid residue in combination with another flavoring agent; or
   b) one or more amino acid derivatives having an N-lactoyl-X structure, where X represents an amino acid residue in combination with another flavoring agent.

9. A flavoring composition containing as a flavoring ingredient:
   a) one or more tripeptides containing a hydrophobic amino acid residue and at least one acidic amino acid residue;
   b) one or more amino acid derivatives having an N-lactoyl-X structure, where X represents an amino acid residue; and
   c) one or more amino acids.

10. An edible product for man or animals, comprising of foodstuff and containing as a flavoring ingredient:
    a) one or more tripeptides containing a hydrophobic amino acid residue and at least one acidic amino acid residue; or
    b) one or more amino acid derivatives having an N-lactoyl-X structure, where X represents an amino acid residue.

11. An edible product according to claim 10, in the form of a butter or margarine, mayonnaise, chocolate, cream or ice-cream, soup, sauce, ready-to-eat meal, sweet or savoury biscuit, dessert or drink.

12. A compound consisting of:
    an amino acid derivative having an N-lactoyl-X structure, where X represents an amino acid residue, it being understood that the Lac-Leu, Lac-Ile, Lac-Ala, Lac-Val and Lac-Gly derivatives are excluded.

13. A flavoring composition according to claim 8, comprising a tripeptide which contains two acidic amino acid residues.

14. A flavoring composition according to claim 8, wherein the acidic amino acid residue or residues are glutamyl residues.

15. A flavoring composition according to claim 8, which comprises a tripeptide selected from the group consisting of Glu-Glu-Leu, Glu(Glu-Leu), Leu-Glu-Glu, Glu-Asp-Phe, Glu-Glu-Ile, Asp-Glu-Leu and Glu-Leu-Glu.

16. A flavoring composition according to claim 8, which comprises an amino acid derivative selected from the group consisting of Lac-Glu, Lac-Ala and Lac-Met.

* * * * *